US012365481B2

(12) United States Patent
Lee et al.

(10) Patent No.: US 12,365,481 B2
(45) Date of Patent: Jul. 22, 2025

(54) FLIGHT CONTROL APPARATUS FOR AERIAL VEHICLE AND METHOD OF OPERATING SAME

(71) Applicants: Hyundai Motor Company, Seoul (KR); Kia Corporation, Seoul (KR)

(72) Inventors: Hong Ju Lee, Anyang-si (KR); Gun Hee Moon, Seoul (KR); Hye In Jung, Suwon-si (KR); Kyu Nam Kim, Seongnam-si (KR); Hyun Jee Ryu, Gunpo-si (KR); Chang Hyun Sung, Yongin-si (KR); Jun Young Lim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 186 days.

(21) Appl. No.: 17/986,336

(22) Filed: Nov. 14, 2022

(65) Prior Publication Data

US 2023/0331396 A1    Oct. 19, 2023

(30) Foreign Application Priority Data

Apr. 18, 2022    (KR) .......................... 1020220047654

(51) Int. Cl.
*B64D 45/00*    (2006.01)
*B64C 39/02*    (2023.01)
(Continued)

(52) U.S. Cl.
CPC ............ *B64D 45/00* (2013.01); *B64C 39/024* (2013.01); *G08G 5/54* (2025.01); *G08G 5/55* (2025.01);
(Continued)

(58) Field of Classification Search
CPC ............ B64D 45/00; B64D 2045/0085; B64C 39/024; G08G 5/0069; G08G 5/02;
(Continued)

(56) References Cited

U.S. PATENT DOCUMENTS 6,466,888 B1 *  10/2002  McCool ............... G05D 1/0825
                                                              702/144
11,235,890 B1 *  2/2022  Dahlstrom ............. B64U 10/60
(Continued)

FOREIGN PATENT DOCUMENTS

JP          2021093215        6/2021
KR        1020120114060      10/2012
(Continued)

OTHER PUBLICATIONS

Guillermo Heredia and AnÃ­bal Ollero Article: Virtual Sensor for Failure Detection, Identification and Recovery in the Transition Phase of a Morphing Aircraft sensors ISSN 1424-8220 www.mdpi.com/journal/sensors (Year: 2010).*
(Continued)

*Primary Examiner* — Hunter B Lonsberry
*Assistant Examiner* — Jalal C Coduroglu
(74) *Attorney, Agent, or Firm* — Fish & Richardson P.C.

(57) ABSTRACT

Disclosed are a flight control apparatus for an aerial vehicle and a method of operating the same. The flight control apparatus includes a communication circuit that establishes communication with a control system and receive first information related to operation information for controlling flight of an aerial vehicle from the control system, a sensor that obtains second information related to flight data of the aerial vehicle, a memory that stores a prediction model for predicting a flight state of the aerial vehicle based on the first information and the second information, and a flight parameter estimation value including at least one of a landing gear
(Continued)

spring coefficient, an aerodynamic coefficient, a friction coefficient, an control surface effect, a thrust coefficient, or inertia moment or any combination thereof or any combination thereof, and a processor that is electrically connected to the communication circuit, the sensor, and the memory.

18 Claims, 8 Drawing Sheets

(51) Int. Cl.
*G08G 5/54* (2025.01)
*G08G 5/55* (2025.01)
*G08G 5/57* (2025.01)

(52) U.S. Cl.
CPC ....... *G08G 5/57* (2025.01); *B64D 2045/0085* (2013.01)

(58) Field of Classification Search
CPC .... G05B 13/048; G05B 13/042; G05B 23/02; G05D 1/042; G05D 1/101; B64U 2201/10
See application file for complete search history.

(56) References Cited

U.S. PATENT DOCUMENTS

| | | | | |
|---|---|---|---|---|
| 11,964,780 | B2 * | 4/2024 | Wiegman | B64D 31/16 |
| 2011/0031346 | A1 * | 2/2011 | Allieta | B64C 27/68 |
| | | | | 244/17.13 |
| 2013/0030610 | A1 * | 1/2013 | Goupil | G05D 1/0077 |
| | | | | 701/3 |
| 2015/0233730 | A1 * | 8/2015 | Guillet | G01C 23/00 |
| | | | | 701/3 |
| 2016/0161524 | A1 * | 6/2016 | Delporte | G01P 5/14 |
| | | | | 702/144 |
| 2017/0163734 | A1 * | 6/2017 | Basu | H04L 67/12 |
| 2019/0005585 | A1 | 1/2019 | Biason et al. | |
| 2019/0033862 | A1 * | 1/2019 | Groden | G05D 1/0088 |
| 2020/0369384 | A1 * | 11/2020 | Kelly | G08G 5/006 |
| 2022/0206514 | A1 * | 6/2022 | Tazume | G01S 17/933 |
| 2023/0054141 | A1 * | 2/2023 | Auerbach | B64C 13/505 |
| 2023/0154337 | A1 * | 5/2023 | Foland | G08G 5/0013 |
| 2023/0356859 | A1 * | 11/2023 | Lohe | B64F 5/40 |

FOREIGN PATENT DOCUMENTS

| | | | |
|---|---|---|---|
| WO | WO 2019/122842 | 6/2019 | |
| WO | WO-2023044173 A2 * | 3/2023 | ............ B64D 27/24 |

OTHER PUBLICATIONS

Guillermo Heredia and AnÃ­bal Ollero Article: Virtual Sensor for Failure Detection, Identification and Recovery in the Transition Phase of a Morphing Aircraft sensors ISSN 1424-8220 www.mdpi.com/journal/sensors (Year: 2010) (Year: 2010).*

* cited by examiner

FLIGHT CONTROL APPARATUS FOR AERIAL VEHICLE AND METHOD OF OPERATING SAME

CROSS-REFERENCE TO RELATED APPLICATION

This application claims the benefit of priority to Korean Patent Application No. 10-2022-0047654, filed in the Korean Intellectual Property Office on Apr. 18, 2022, the entire contents of which are incorporated herein by reference.

TECHNICAL FIELD

The present disclosure relates to a flight control apparatus for an aerial vehicle and a method of operating the same, and more particularly, to technology that collects flight parameters of an aerial vehicle based on a flight state of the aerial vehicle predicted through a flight state prediction model and an actual flight state confirmed through a sensor during flight, thereby improving the flight control performance of an aerial vehicle.

BACKGROUND

An aerial vehicle may be classified as an unmanned aerial vehicle or a manned aerial vehicle. The unmanned aerial vehicle may flies by induction of radio waves without a person riding on it. The manned aerial vehicle may be controlled by a pilot, or at least a part of the control function may be performed based on an autonomous flight system. The scope of use of the aerial vehicle has been expanded for purposes such as military, delivery of goods, taking pictures or videos, and the like.

The aerial vehicle may fly according to operation information generated from a separate manipulation device or control system. For example, the aerial vehicle may change the flight altitude or move or rotate at the same altitude according to the operation information.

When the aerial vehicle is controlled by the manipulation device, a case may occur that the aerial vehicle cannot fly according to a predetermined flight path due to the inexperienced operation of the operator. In addition, when the aerial vehicle is controlled by the control system, the aerial vehicle may be controlled more stable than when the aerial vehicle is controlled by a manipulation device. However, stable flight of the aerial vehicle may not be guaranteed due to defects in the aerial vehicle or external environmental causes (e.g., wind, surrounding obstacles, and the like) during flight.

SUMMARY

The present disclosure has been made to solve the above-mentioned problems occurring in the prior art while advantages achieved by the prior art are maintained intact.

One aspect of the present disclosure provides a flight control apparatus for an aerial vehicle and a method of operating the same which can collect the flight parameters for the aerial vehicle based on the flight state predicted through the flight state prediction model and the actual flight state confirmed through the sensor while the aerial vehicle is flying, and apply the flight parameters to flight control.

Another aspect of the present disclosure provides a flight control apparatus for an aerial vehicle and a method of operating the same which can update the flight state prediction model based on the flight state predicted through the flight state prediction model and the actual flight state confirmed through the sensor while the aerial vehicle is flying, thereby improving the flight control performance of the aerial vehicle.

Still another aspect of the present disclosure provides a flight control apparatus for an aerial vehicle and a method of operating the same which can use the updated flight state prediction model to determine whether there is a defect in the aerial vehicle.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a flight control apparatus includes a communication circuit that establishes communication with a control system and receive first information related to operation information for controlling flight of an aerial vehicle from the control system, a sensor that obtains second information related to flight data of the aerial vehicle, a memory that stores a prediction model for predicting a flight state of the aerial vehicle based on the first information and the second information, and a flight parameter estimation value including at least one of a landing gear spring coefficient, an aerodynamic coefficient, a friction coefficient, an control surface effect, a thrust coefficient, or inertia moment or any combination thereof, and a processor that is electrically connected to the communication circuit, the sensor and the memory, wherein the processor generates a control signal for controlling the flight of the aerial vehicle based on the first information and the flight parameter estimation value, compares an estimated measurement value of a state variable of the aerial vehicle predicted through the prediction model with a state variable measurement value of the aerial vehicle measured based on the second information while the flight of the aerial vehicle is controlled based on the control signal, generates the control signal based on the flight parameter estimation value stored in the memory when a difference between the estimated measurement value of the state variable and the state variable measurement value is within a specified range, and updates the flight parameter estimation value stored in the memory and generate the control signal based on the updated flight parameter estimation value when the difference between the estimated measurement value of the state variable and the state variable measurement value is out of the specified range.

In some implementations, the processor may compare the predicted flight state of the aerial vehicle predicted through the prediction model with an actual flight state of the aerial vehicle determined based on the second information, update the prediction model stored in the memory based on a comparison result, and control the flight of the aerial vehicle based on the predicted flight state of the aerial vehicle predicted through the updated prediction model.

In some implementations, the processor may generate a specified control signal to control the flight of the aerial vehicle, and update the prediction model by using a flight parameter as learning data while the flight is controlled corresponding to the generated control signal.

In some implementations, the processor may monitor a defect of the aerial vehicle based on a flight state predicted through the prediction model and a flight state obtained based on the second information while the flight of the aerial vehicle is controlled.

In some implementations, the sensor may include a first sensor that obtains information related to first flight data and a second sensor related to second flight data, wherein the processor may deactivate an operation of the first sensor, compare a predicted response of the aerial vehicle predicted through the prediction model while the operation of the first sensor is deactivated with an actual response of the aerial vehicle determined based on second information collected through the second sensor, and determine an occurrence of a defect in the first sensor when a difference between the predicted response and the actual response is greater than or equal to a specified level.

In some implementations, the processor may notify the control system of the defect when the defect of the first sensor is monitored.

In some implementations, the flight control apparatus may further include an output device including at least one of a light emitting device or a speaker, wherein the processor may notify the defect through the output device when the defect of the first sensor is monitored.

In some implementations, the processor may generate a control command for inducing an emergency landing to a specified location when the defect of the first sensor is monitored.

In some implementations, the processor may use information generated by a virtual sensor instead of the first sensor to estimate the flight state of the aerial vehicle when the defect of the first sensor is monitored.

In some implementations, the processor may determine whether the second sensor is defective after determining whether the first sensor is defective.

According to another aspect of the present disclosure, a method of operating a flight control apparatus includes receiving first information related to operation information for controlling flight of an aerial vehicle from a control system, generating a control signal for controlling flight of the aerial vehicle based on the first information and a flight parameter estimation value including at least one of a landing gear spring coefficient, an aerodynamic coefficient, a friction coefficient, an control surface effect, a thrust coefficient, or inertia moment or any combination thereof stored in the aerial vehicle, obtaining second information related to flight data through a sensor provided in the aerial vehicle while flight of the aerial vehicle is controlled based on the control signal, predicting an estimated measurement value of a state variable for the aerial vehicle by using a prediction model using the first information and the second information as input data, comparing the estimated measurement value of the state variable of the aerial vehicle with a state variable measurement value of the aerial vehicle measured based on the second information, generating the control signal based on the flight parameter estimation value stored in the aerial vehicle when a difference between the estimated measurement value of the state variable and the state variable measurement value is within a specified range, and updating the flight parameter estimation value stored in the aerial vehicle and generating the control signal based on the updated flight parameter estimation value when the difference between the estimated measurement value of the state variable and the state variable measurement value is out of the specified range.

In some implementations, the method may further include comparing the predicted flight state of the aerial vehicle predicted through the prediction model with an actual flight state of the aerial vehicle determined based on the second information, updating the prediction model stored in the aerial vehicle based on a comparison result, and controlling the flight of the aerial vehicle based on the predicted flight state of the aerial vehicle predicted through the updated prediction model.

In some implementations, the updating of the prediction model may include generating a specified control signal to control the flight of the aerial vehicle, and updating the prediction model by using a flight parameter as learning data while the flight is controlled corresponding to the generated control signal.

In some implementations, the method may further include monitoring a defect of the aerial vehicle based on a flight state predicted through the prediction model and a flight state obtained based on the second information while the flight of the aerial vehicle is controlled.

In some implementations, the sensor may include a first sensor configured to obtain information related to first flight data and a second sensor related to second flight data, wherein the monitoring of the defect of the aerial vehicle includes deactivating an operation of the first sensor, comparing a predicted response of the aerial vehicle predicted through the prediction model while the operation of the first sensor is deactivated with an actual response of the aerial vehicle determined based on second information collected through the second sensor, and determining an occurrence of a defect in the first sensor when a difference between the predicted response and the actual response is greater than or equal to a specified level.

In some implementations, the monitoring of the defect of the aerial vehicle may include notifying the control system of the defect when the defect of the first sensor is monitored.

In some implementations, the monitoring of the defect of the aerial vehicle may include notifying the defect through at least one of a light emitting device or a speaker of the aerial vehicle when the defect of the first sensor is monitored.

In some implementations, the monitoring of the defect of the aerial vehicle may include generating a control command for inducing an emergency landing to a specified location when the defect of the first sensor is monitored.

In some implementations, the monitoring of the defect of the aerial vehicle may include using information generated by a virtual sensor instead of the first sensor to estimate the flight state of the aerial vehicle when the defect of the first sensor is monitored.

In some implementations, the monitoring of the defect of the aerial vehicle may include determining whether the second sensor is defective after determining whether the first sensor is defective.

BRIEF DESCRIPTION OF THE DRAWINGS

The above and other objects, features and advantages of the present disclosure will be more apparent from the following detailed description taken in conjunction with the accompanying drawings.

With regard to description of drawings, the same or similar elements may be marked by the same or similar reference numerals.

DETAILED DESCRIPTION

Hereinafter, the present disclosure will be described in detail with reference to the exemplary drawings. In adding the reference numerals to the components of each drawing, it should be noted that the identical or equivalent component is designated by the identical numeral even when they are displayed on other drawings. Further, in describing the present disclosure, a detailed description of the related known configuration or function will be omitted when it is determined that it interferes with the understanding of the present disclosure.

In describing the components of the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, implementations of the present disclosure will be described in detail with reference to FIGS. 1 to 5.

Figure 1:
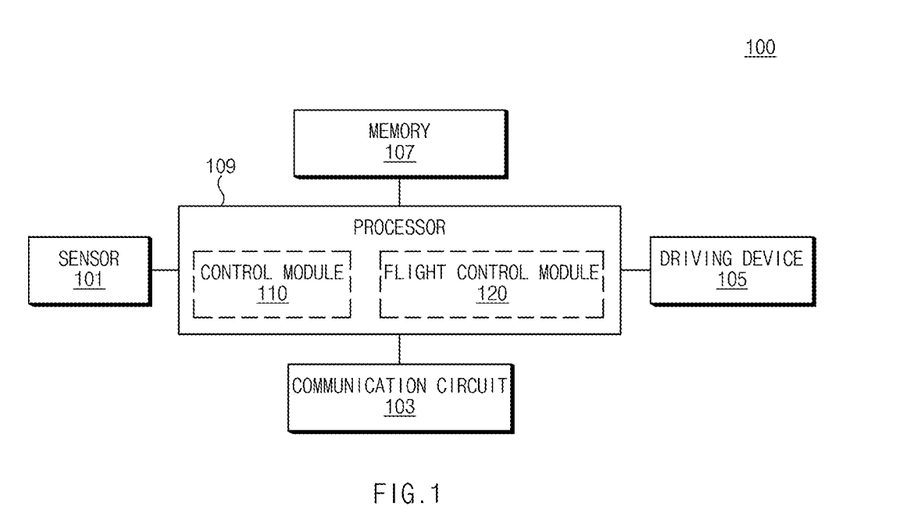
FIG. 1 is a block diagram illustrating the configuration of a flight control apparatus.

FIG. 1 is a block diagram illustrating the configuration of a flight control apparatus according to various implementations of the present disclosure. For example, a flight control apparatus according to various implementations may be interpreted as an aerial vehicle or a part of an aerial vehicle.

Referring to FIG. 1, a flight control apparatus (or aerial vehicle) 100 according to various implementations may include a sensor 101, a communication circuit 103, a driving device 105, a memory 107 and a processor 109. However, this is merely exemplary, and implementations of the present disclosure are not limited thereto. For example, at least one of the above-described components of the flight control apparatus 100 may be omitted or one or more other components (e.g., camera, battery, display device, and the like) may be added as a configuration of the flight control apparatus 100. In addition, at least one of the above-described components of the flight control apparatus 100 may be provided integrally with other components.

According to various implementations, the sensor 101 may be mounted on the inside of the aerial vehicle, or at least a part thereof may be provided to be exposed through the outside of the aerial vehicle. In some implementations, the sensor 101 may include at least one sensor configured to obtain flight data of an aerial vehicle.

For example, at least a piece of the flight data may include at least one of posture, location, angular velocity, flight direction, acceleration, flight speed, flight altitude, weight, angle of attack, and temperature of the aerial vehicle. However, this is merely exemplary, and the embodiment is not limited thereto. For example, the sensor 101 may further include various sensors capable of detecting the surrounding environment (e.g., surrounding objects) of the aerial vehicle, such as a LIDAR sensor, a radar sensor, a camera sensor, an ultrasonic sensor, and the like.

According to various implementations, the communication circuit 103 may support establishment of a communication channel with a control system (e.g., a manipulation device or a control system) and communication through the established communication channel. In some implementations, the communication circuit 103 may include a cellular communication circuit and/or a short-range wireless communication circuit.

According to various implementations, the driving device 105 may generate a driving force such that the aerial vehicle can fly (e.g., horizontally or vertically). In some implementations, the driving device 105 may include at least one propeller and at least one motor.

For example, a plurality of propellers and motors may be arranged symmetrically based on the center of the aerial vehicle. However, this is merely exemplary, and the embodiment is not limited thereto. For example, the propeller and the motor may be provided in the aerial vehicle in various forms. In addition, an air injection type of driving device instead of a propeller may be provided as a component of the flight control apparatus 100, and depending on the implementation, the air injection type driving device may be provided together with the propeller as a component of the flight control apparatus 100.

According to various implementations, the memory 107 may include data on at least another component (e.g., the sensor 101, the communication circuit 103, the driving device 105 and the processor 109) provided in the flight control apparatus 100, and programs, algorithms, routines and/or instructions related to operations (or controls) of the flight control apparatus 100.

In some implementations, the memory 107 may include at least one type of a storage medium of memories of a flash memory type, a hard disk type, a micro type, a card type (e.g., a secure digital (SD) card or an extreme digital (XD) card), and the like, and a random access memory (RAM), a static RAM, a read-only memory (ROM), a programmable ROM (PROM), an electrically erasable PROM (EEPROM), a magnetic memory (MRAM), a magnetic disk, and an optical disk type memory.

According to various implementations, the processor 109 may be electrically connected to the sensor 101, the communication circuit 103, the driving device 105 and the memory 107, and may control the overall operation of the flight control apparatus 100.

In some implementations, the processor 109 may control the operation of the flight control apparatus 100 based on the operation information provided from a control system (e.g., a manipulation device or a control system). The operation information provided from the control system may be, for example, an instruction for instructing at least one of a location, a flight direction, a flight distance, a rotation angle, a flight altitude, and a flight speed for the aerial vehicle. For example, the processor 109 may control the operation of the driving device 105 such that the aerial vehicle flies corresponding to the operation information.

According to various implementations, the processor 109 may control the aerial vehicle to maintain a specified posture (e.g., a horizontal posture) by using information collected through the sensor 101. Accordingly, it is possible to prevent the aerial vehicle from flying in an unstable posture due to the inexperienced operation of the pilot, the occurrence of defects in the aerial vehicle, or external environmental causes (e.g., wind, surrounding obstacles, and the like)

during flight. In some implementations, the processor 109 may control the current posture (e.g., a horizontal reference posture) of the aerial vehicle to correspond to a specified reference posture.

For example, the processor 109 may determine whether the posture control for the aerial vehicle is necessary by comparing the current posture of the aerial vehicle with a specified reference posture. For example, when the current posture of the aerial vehicle is substantially the same as the specified reference posture (or similar at a specified degree), the processor 109 may determine that posture control is unnecessary and control the aerial vehicle to maintain the current posture. To the contrary, when the difference between the current posture of the aerial vehicle and the specified reference posture is equal to or greater than a specified degree, the processor 109 may change the posture of the aerial vehicle to correspond to the specified reference posture.

In this regard, the processor 109 may include a posture control module 110 configured to determine the current posture of the aerial vehicle by using the information collected through the sensor 101 and a flight control module 120 configured to change the posture of the aerial vehicle based on the determination of the posture control module 110.

For example, the posture control module 110 may generate a specified control signal such that the aerial vehicle takes a specified posture and provide the specified control signal to the flight control module 120. Accordingly, the flight control module 120 may control the operation of the driving device 105 in response to the control signal provided from the posture control module 110. However, this is merely exemplary, and the embodiment of the present disclosure is not limited thereto. For example, the posture control module 110 may provide posture information of the aerial vehicle to the flight control module 120 instead of the control signal, and the flight control module 120 may control the operation of the driving device 105 based on the posture information.

According to various implementations, the processor 109 may machine-learn the operation information collected through the sensor 101 during flight and/or the operation information received from a control system (e.g., a manipulation device or a monitoring system) to predict the flight state of the aerial vehicle, and then, may generate a control signal for the aerial vehicle based on the prediction result.

In some implementations, the processor 109 may generate a control signal based on the flight parameter estimation value and the operation information received from a control system (e.g., a manipulation device or a monitoring system) as shown in following Equation 1.

$$u = u(x, \hat{\theta})$$ [Equation 1]

In Equation 1, the function u ( ) for generating the control signal may generate control signal (u) by using the state variable (x) of the aerial vehicle to be controlled corresponding to the operation information and the flight parameter estimation value ($\hat{\theta}$) of the aerial vehicle controlled corresponding to the control signal as input data. For example, the state variable of the aerial vehicle may include at least one of a flight altitude, a flight path angle, a flight speed, or a flight posture.

In addition, the flight parameter estimation value may include at least one of a landing gear spring coefficient, an aerodynamic coefficient, a friction coefficient, a control surface effect, a thrust coefficient, and a moment of inertia. As described below with reference to FIG. 2A, it is possible to update the flight parameter estimation value periodically or continuously while the aerial vehicle is controlled in response to the control signal.

According to various implementations, the processor 109 may measure a rate of change of the state variable for the aerial vehicle while the aerial vehicle is controlled in response to the control signal. The rate of change of the state variable may refer to a rate of change with respect to time of the state variable that is changed corresponding to operation information.

Additionally, the processor 109 may calculate an estimated measurement value of the state variable for the aerial vehicle while the aerial vehicle is controlled in response to the control signal.

In this regard, the processor 109 may include a flight state prediction module 200 described with reference to FIGS. 2A to 2D below. The flight state prediction module 200 may be provided integrated with at least one of the posture control module 110 or the flight control module 120. In addition, the flight state prediction module 200 may be provided separated from the posture control module 110 and the flight control module 120.

Hereinafter, the flight state prediction module 200 according to various implementations will be described with reference to FIGS. 2A to 2D.

Figure 2A:
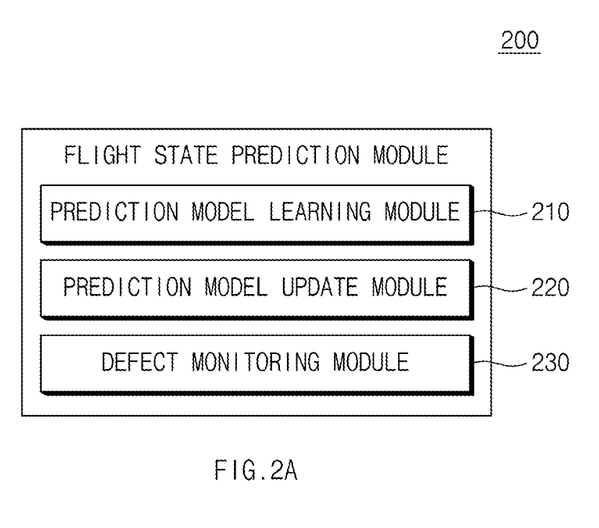
FIG. 2A is a diagram illustrating the configuration of a flight state prediction module.
Figure 2B:
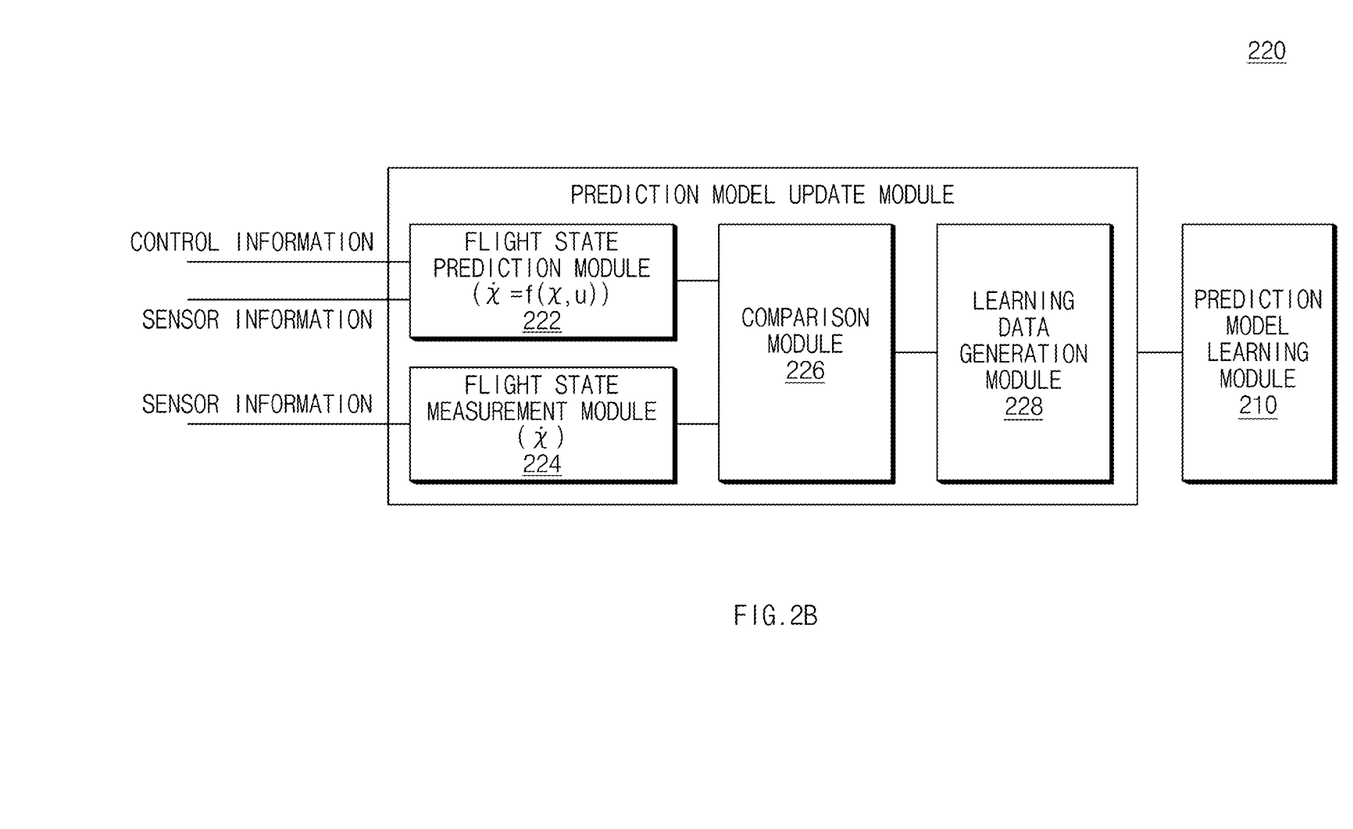
FIG. 2B is a diagram illustrating the configuration of a prediction model update module.
Figure 2C:
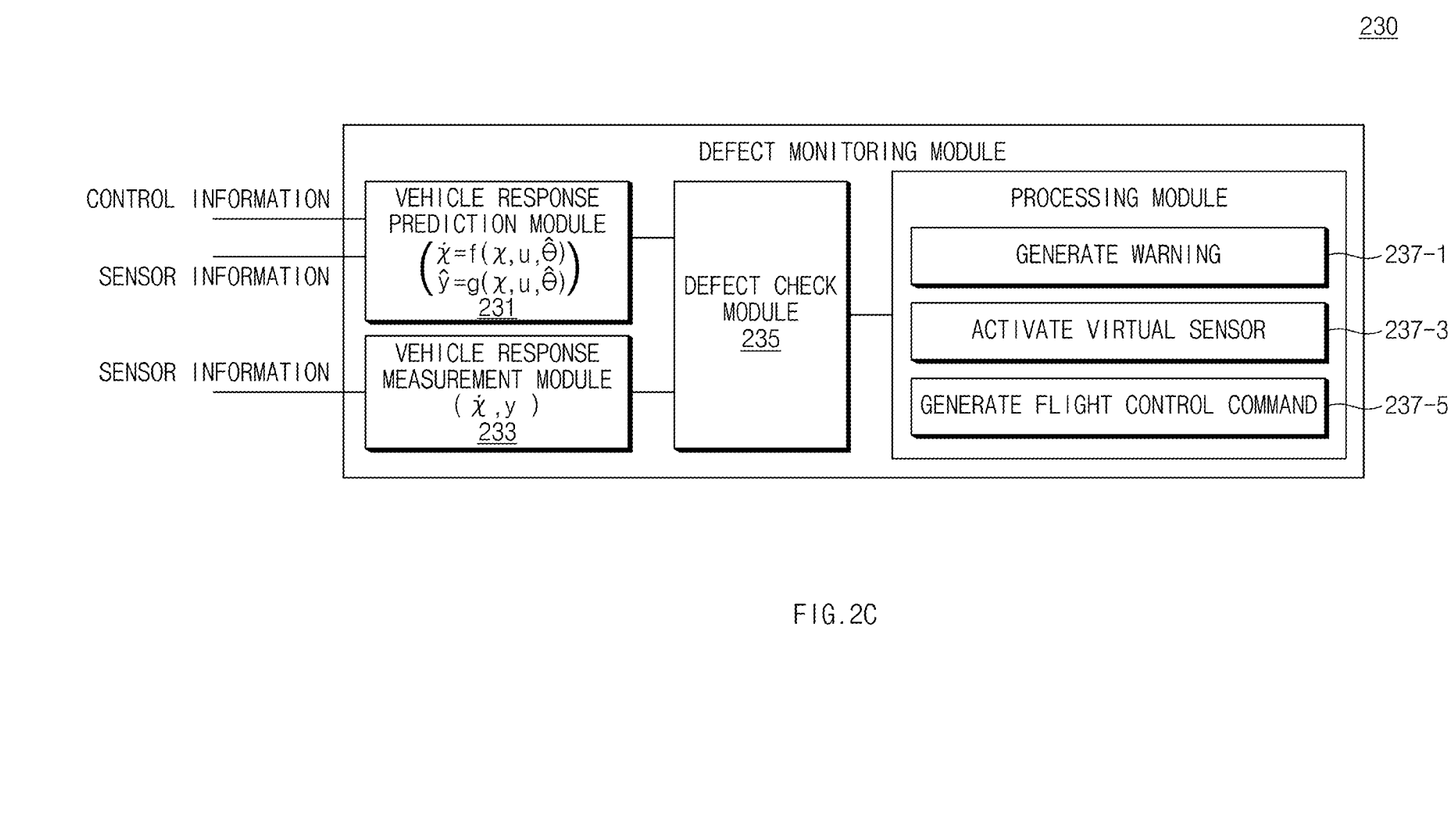
FIG. 2C is a diagram illustrating a defect monitoring module.
Figure 2D:
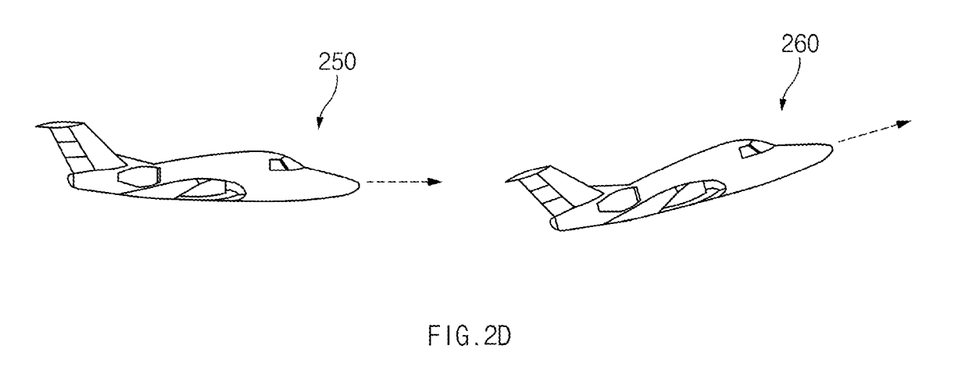
FIG. 2D is a diagram illustrating a prediction model update time.

FIG. 2A is a diagram illustrating the configuration of a flight state prediction module. FIG. 2B is a diagram illustrating the configuration of a prediction model update module. FIG. 2C is a diagram illustrating a defect monitoring module. FIG. 2D is a diagram illustrating a prediction model update time.

Referring to FIG. 2A, the flight state prediction module 200 may include a prediction model learning module 210, a prediction model update module 220, and a defect monitoring module 230.

According to various implementations, the prediction model learning module 210 may learn a state prediction model for predicting the flight state of the aerial vehicle, and calculate the rate of change of the state variable for the aerial vehicle by using the learned state prediction model. The state prediction model may be implemented based on a machine learning model and stored in the memory 107. For example, the state prediction model may be defined to calculate a rate of change of a state variable of the aerial vehicle based on the control signal corresponding to the operation information received from a control system (e.g., a manipulation device or a monitoring system) and the state variable of the aerial vehicle as shown in following Equation 2.

$$\dot{x} = f(x, u)$$ [Equation 2]

In Equation 2, function f( ) for predicting the flight state of the aerial vehicle may calculate a rate of change ($\dot{x}$) of the state variable of the aerial vehicle by using the state variable (x) of the aerial vehicle to be controlled corresponding to the operation information and the control signal (u) corresponding to the operation information received from the control system as input data. For example, the state variable of the aerial vehicle may include at least one of a flight altitude, a flight path angle, a flight speed, or a flight posture.

Additionally or alternatively, the processor 109 can be configured to control the aerial vehicle to safely fly within a specified flight area. In this regard, the prediction model learning module 210 may learn the state variable prediction model that predicts the estimated measurement value of the state variable for the aerial vehicle in advance, and may calculate the estimated measurement value of the state variable for the aerial vehicle by using the learned state variable prediction model.

The estimated measurement values of the state variables may limit the pitch angle, angle of attack, flight speed, flight altitude, and the like to restrict the aerial vehicle from flying at an excessive inclination angle, an over-speed, and the like and entering a flight restriction area during flight. For example, the state variable prediction model may be defined to predict the estimated measurement value of the state variable based on the control signal corresponding to the operation information received from the control system (e.g., a manipulation device or a monitoring system) and the state variable of the aerial vehicle as shown in following Equation 3.

$$\hat{y}=g(x,u) \quad \text{[Equation 3]}$$

In Equation 3, function g( ) for predicting the flight state of the aerial vehicle may calculate the estimated measurement value ($\hat{y}$) of the state variable by using the state variable (x) of the aerial vehicle to be controlled corresponding to the operation information and the control signal (u) corresponding to the operation information received from the control system as input data.

According to various implementations, the prediction model update module 220 may be configured to periodically or continuously update the prediction model (e.g., a state prediction model and/or a state variable prediction model) stored in the memory 107. As an example, the update of the prediction model may include re-learning (or training) the prediction model stored in the memory 107 using new learning data. In addition, the update of the prediction model may include newly selecting one prediction model having relatively high prediction accuracy among a plurality of prediction models.

For example, the prediction model update module 220 may update the prediction model (e.g., the state prediction model and/or the state variable prediction model) stored in the memory 107 when the difference between the flight state of the aerial vehicle (e.g., as shown in FIG. 2D, a first flight state 250 in which the aerial vehicle flies in the first direction) predicted based on the rate ($\dot{x}$) of change of the state variable (and/or the estimated measurement value ($\hat{y}$) of the state variable) calculated through the prediction model and the actual flight state (e.g., as shown in FIG. 2D, a second flight state 260 in which the aerial vehicle flies in the second direction different from the first direction) of the aerial vehicle corresponding to the state variable collected through the sensor 101 is equal to or greater than a specified degree.

In addition, when the predicted flight state of the aerial vehicle and the actual flight state of the aerial vehicle are substantially the same, the prediction model update module 220 may control the flight of the aerial vehicle by using the prediction model (or a learned prediction model) stored in the memory 107 without updating the prediction model (e.g., the state prediction model and/or the state variable prediction model) stored in the memory 107.

According to various implementations, as shown in FIG. 2B, the prediction model update module 220 may include a flight state prediction module 222, a flight state measurement module 224, a comparison module 226, and a learning data generation module 228.

In some implementations, the flight state prediction module 222 may predict the flight state (e.g., the first flight state) of the aerial vehicle by using the state prediction model stored in the memory 107. For example, as described with Equation 2 and Equation 3, the flight state prediction module 222 may calculate the rate of change of the state variable of the aerial vehicle and/or the estimated measurement value of the state variable in response to a control signal corresponding to the state variable of the aerial vehicle and operation information received from the control system as input data.

In some implementations, the flight state measurement module 224 may determine the actual flight state (e.g., the second flight state) of the aerial vehicle based on information collected through the sensor 101.

In some implementations, the comparison module 226 may compare the flight state (e.g., the first flight state) predicted by the flight state prediction model 222 with the actual flight state (e.g., the second flight state) determined by the information collected by the sensor 101 to determine update of the prediction model. For example, when the predicted flight state (e.g., the first flight state) and the actual flight state (e.g., the second flight state) are substantially the same, the comparison module 226 may determine that it is unnecessary to update the prediction model. In addition, when the difference between the predicted flight state (e.g., the first flight state) and the actual flight state (e.g., the second flight state) is equal to or greater than a specified degree, the comparison module 226 may determine that it is necessary to update the prediction model.

In some implementations, the learning data generation module 228 may generate learning (or training) data to update the prediction model. For example, the learning data generation module 228 may control the aerial vehicle to fly in a specified flight pattern in order to generate the learning data.

For example, in response to the determination result of the comparison module 226 that it is necessary to update the prediction model, the learning data generation module 228 may generate operation information such as a doublet input, a step input, a pulse input, and the like to allow the aerial vehicle to fly and may generate, as the learning data, state variables collected while the aerial vehicle flies. However, this is merely exemplary, and implementations of the present disclosure are not limited thereto. For example, the operation information (e.g., the doublet input, the step input, the pulse input, and the like) of the aerial vehicle for generating the learning data may be provided by the control system (e.g., a manipulation device or a monitoring system).

In some implementations, the learning data generation module 228 may generate the flight parameter estimation value for the aerial vehicle as learning data and provide the flight parameter estimation value for the aerial vehicle to the prediction model learning module 210 while the aerial vehicle is controlled in response to the control signal corresponding to operation information (e.g., doublet input). For example, the flight parameter estimation value may include at least one of a landing gear spring coefficient, an aerodynamic coefficient, a friction coefficient, a control surface effect, a thrust coefficient, and a moment of inertia obtained through analysis, test, or learning. Accordingly, the prediction model stored in the memory 107 may be newly learned (or trained) and updated by the prediction model learning module 210 as shown in Equation 4 and Equation 5 below.

$$\dot{x}=f(x,u,\hat{\theta}) \quad \text{[Equation 4]}$$

In Equation 4, the updated function (f) for calculating the rate of change of the state variable of the aerial vehicle may predict the rate ($\dot{x}$) of change of the state variable of the aerial vehicle by using the operation information (u), the state variable (x) of the aerial vehicle, and the flight parameter estimation value ($\hat{\theta}$) for the aerial vehicle as input data.

$$\hat{y}=g(x,u,\hat{\theta})$$ [Equation 3]

In Equation 5, the updated function g( ) for calculating the estimated measurement value of the state variable may predict the estimated measurement value ($\hat{y}$) of the state variable of the aerial vehicle by using the control signal (u), the state variable (x) of the aerial vehicle and the flight parameter estimation value ($\hat{\theta}$) for the aerial vehicle as input data.

In some implementations, the learning data generation module 228 may predict and/or update the flight parameter estimation value ($\hat{\theta}$) based on the measurement value of the state variable of the aerial vehicle collected through the sensor and the estimated measurement value of the state variable as shown in Equation 6 below.

$$\hat{\theta}=\hat{\theta}(y,\hat{y})$$ [Equation 6]

In Equation 6, the function ($\hat{\theta}$) for calculating the flight parameter estimation value may predict and/or update the flight parameter estimation value ($\hat{\theta}$) by using the measurement value (y) of the state variable of the aerial vehicle and the estimated measurement value ($\hat{\theta}$) of the state variable as input data.

In some implementations, the learning data generation module 228 may predict different types of flight parameter estimation values corresponding to the flight state of the aerial vehicle. For example, the learning data generation module 228 may predict estimated values for an aerodynamic coefficient, a control surface effect, a thrust coefficient, and a moment of inertia in the flight state of the aerial vehicle. As another example, the learning data generation module 228 may predict an estimated value for the amount of change in the aerodynamic coefficient due to the ground effect in the take-off or landing state of the aerial vehicle. As still another example, the learning data generation module 228 may predict estimated values for the friction coefficient, the landing gear spring coefficient, and the control surface effect in the ground gliding state of the aerial vehicle.

In addition, the learning data generation module 228 may process the estimated measurement value ($\hat{y}$) of the predicted and/or updated state variable to be used to generate the control signal (u). In addition, the learning data generation module 228 may provide the estimated measurement value ($\hat{y}$) of the predicted and/or updated state variable to a control system (e.g., a manipulation device or a monitoring system). Accordingly, the control system may monitor whether the estimated measurement value of the state variable in the aerial vehicle is accurately measured, and when the estimated measurement value of the state variable is incorrectly measured, the control system may instruct the aerial vehicle to update the estimated measurement value of the state variable.

In some implementations, the learning data generation module 228 may remove noise included in the collected learning data or derive only meaningful learning data according to a preset rule among the collected learning data to use it as the learning data in order to improve the prediction model learning and updating performance by the prediction model learning module 210.

According to various implementations, the defect monitoring module 230 may monitor the defect (or abnormal response) of the aerial vehicle by using the stored or updated prediction model.

In some implementations, the defect monitoring module 230 may monitor the defect by periodically or continuously generating an operation check signal while the flight of the aerial vehicle is controlled. The operation check signal may be a signal for forcibly changing the operating state of a specific component among components provided in the aerial vehicle.

For example, the operation check signal may be a signal for inactivating the operation of one of the sensors 101 provided in the aerial vehicle or changing (e.g., reducing) the sensing range. For example, the defect monitoring module 230 may predict the response of the aerial vehicle by using the operation check signal as input data for the updated prediction module, and compare the response with an actual response of the aerial vehicle identified based on the information collected through the sensor 101 to monitor the defect of the aerial vehicle. In some implementations, the defect monitoring module 230 may determine whether all components are defective by repeatedly performing the operation of generating an inspection signal for each component provided in the aerial vehicle.

According to various implementations, as shown in FIG. 2C, the defect monitoring module 230 may include a vehicle response prediction module 231, a vehicle response measurement module 233, a defect check module 235, and a processing module 237.

In some implementations, the vehicle response prediction module 231 may predict a fuselage response (e.g., a first response) to the aerial vehicle by using the prediction model stored in the memory 107. For example, it is possible to predict the response of the aerial vehicle caused by a component whose operating state is changed by an operation check signal.

In some implementations, the vehicle response measurement module 233 may determine an actual response (e.g., a second response) of the aerial vehicle based on information collected through the sensor 101.

In some implementations, the defect check module 235 may compare the response (e.g., the first response) of the aerial vehicle predicted by the vehicle response prediction module 231 with the actual response (e.g., the second response) of the aerial vehicle determined by the information collected by the sensor 101 to determine whether there is a defect in the aerial vehicle.

For example, when the predicted response (e.g., the first response) of the aerial vehicle is substantially the same as the actual response (e.g., the second response) of the aerial vehicle, the defect check module 235 may determine that no defects have occurred in the aerial vehicle. In addition, when the difference between the predicted response of the aerial vehicle (e.g., the first response) and the actual response (e.g., the second response) of the aerial vehicle is greater than a specified degree, the defect check module 235 may determine that a defect occurs in the aerial vehicle.

In some implementations, the processing module 237 may process a defect of the aerial vehicle. For example, the processing module 237 may generate and output a warning indicating a defect as a part of defect processing 237-1. Such a warning may be transmitted to the control system to allow the control system to recognize the defect in the aerial vehicle and take immediate action on the defect.

In addition, the warning may be output through the aerial vehicle (e.g., a visual alarm output using the light emission of a light emitting device, an audible alarm output using a speaker, or the like). In this case, another user nearby may recognize the warning output through the aerial vehicle such that it is possible to prevent a defective aerial vehicle from causing an accident.

As another example, the processing module 237 may generate a virtual sensor for the sensor 101 in which a defect occurs as part of defect processing in 237-3. For example, the virtual sensor may generate information estimated to be actually collected through the sensor 101 in a state in which a defect does not occur.

The information generated by such a virtual sensor may be used to estimate (or control flight) the flight state of the aerial vehicle instead of information collected by the sensor 101 in which a defect occurs. However, this is merely exemplary, and the embodiment of the present disclosure is not limited thereto. For example, when a defect is detected in a component other than the sensor 101, the processing module 237-1 may generate a virtual component corresponding to the component in which the defect is detected.

As another example, the processing module 237 may generate a flight control signal based on the defect as part of defect processing in 237-5. For example, the processing module 237 may generate a control signal for inducing an emergency landing to a specified location (or an area) by determining that the normal flight of the aerial vehicle is difficult due to a defect.

Hereinafter, a method of operating an aerial vehicle according to the present disclosure will be described in detail with reference to FIGS. 3 and 4.

Figure 3:
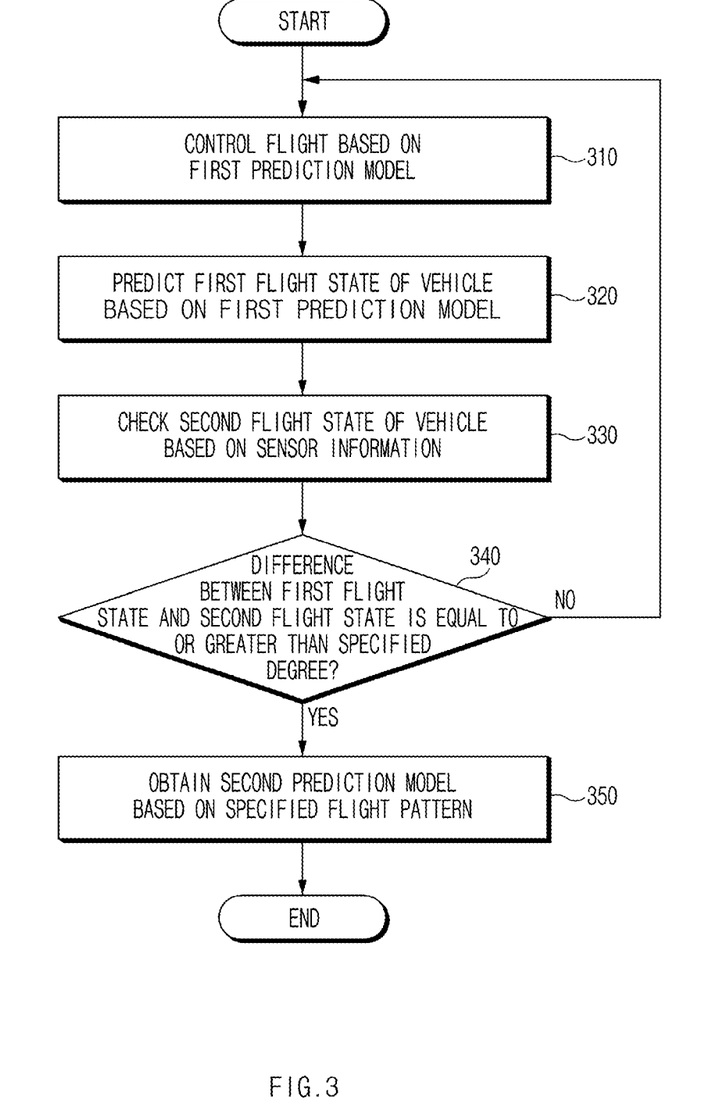
FIG. 3 is a flowchart illustrating the operation of an aerial vehicle.

FIG. 3 is a flowchart illustrating the operation of an aerial vehicle. In the following description, the operations may be sequentially performed, but are not necessarily performed sequentially. For example, the order of operations may be changed, and at least two operations may be performed in parallel. In addition, at least one of the following operations may be omitted.

Referring to FIG. 3, an aerial vehicle (or the flight control apparatus 100 or the processor 109) may control the flight of the aerial vehicle based on the first prediction model in operation 310. For example, the first prediction model may include a state prediction model for predicting a flight state of the aerial vehicle and/or a state variable model for predicting an estimated measurement value of a state variable for the aerial vehicle in advance. In some implementations, the aerial vehicle may control the flight of the aerial vehicle by using the first prediction model which uses the control signal corresponding to information collected through the sensor 101 and operation information received from the control system as input data.

According to various implementations, the aerial vehicle (or the flight control apparatus 100 or the processor 109) may predict the first flight state of the vehicle based on the first prediction model in operation 320. The first prediction model may be a prediction model learned through machine learning to predict the flight state of the aerial vehicle. For example, the first flight state may be predicted by the first prediction model using the control signal for the aerial vehicle and sensor information collected through the sensor 101 of the aerial vehicle as input data.

According to various implementations, the aerial vehicle (or the flight control apparatus 100 or the processor 109) may check the second flight state based on sensor information in operation 330. The second flight state may be an actual flight state of the aerial vehicle determined based on sensor information collected during flight.

According to various implementations, in operation 340, the aerial vehicle (or the flight control apparatus 100 or the processor 109) may determine whether the difference between the first flight state and the second flight state is equal to or greater than a specified degree. In other words, the aerial vehicle may determine whether the flight state predicted through the prediction model is different from the actual flight state.

According to various implementations, when the first flight state and the second flight state are substantially the same, the aerial vehicle (or the flight control apparatus 100 or the processor 109) may control the flight based on the first prediction model. For example, the aerial vehicle may perform operations related to operations 310 to 340.

According to various implementations, when the difference between the first flight state and the second flight state is equal to or greater than a specified degree, in operation 350, the aerial vehicle (or the flight control apparatus 100 or the processor 109) may generate the second prediction model based on a specified pattern. In some implementations, the aerial vehicle may generate operation information such as a doublet input, a step input, a pulse input, and the like, and may fly in response to the control signal corresponding to the generated operation information. In addition, the aerial vehicle may obtain, as learning data, the sensor information collected while flying in response to the control signal, and may learn the first prediction model to obtain the second prediction model.

According to various implementations, the aerial vehicle (or the flight control apparatus 100 or the processor 109) may predict and/or update the flight parameter estimation value by using the measurement value of the state variable of the aerial vehicle during flight and the estimated measurement value of the state variable as input data. In this regard, the aerial vehicle may use the estimated measurement value of the predicted and/or updated state variable to generate the control signal. In some implementations, when the difference between the estimated measurement value of the state variable and the measured value of the state variable is within a specified range, the aerial vehicle may generate the control signal based on the parameter estimation value stored in the aerial vehicle (e.g., the memory 107). According to another embodiment, when the difference between the estimated measurement value of the state variable and the state variable measured value exceeds the specified range, the aerial vehicle updates the parameter estimation value stored in the aerial vehicle, and based on the updated parameter estimation value, the control signal can be generated.

In addition, the aerial vehicle may provide the estimated measurement value ($\hat{y}$) of the predicted and/or updated state variable to the control system (e.g., a manipulation device or a monitoring system) to allow the control system to monitor whether the aerial vehicle accurately measures the estimated measurement value of the state variable.

Figure 4:
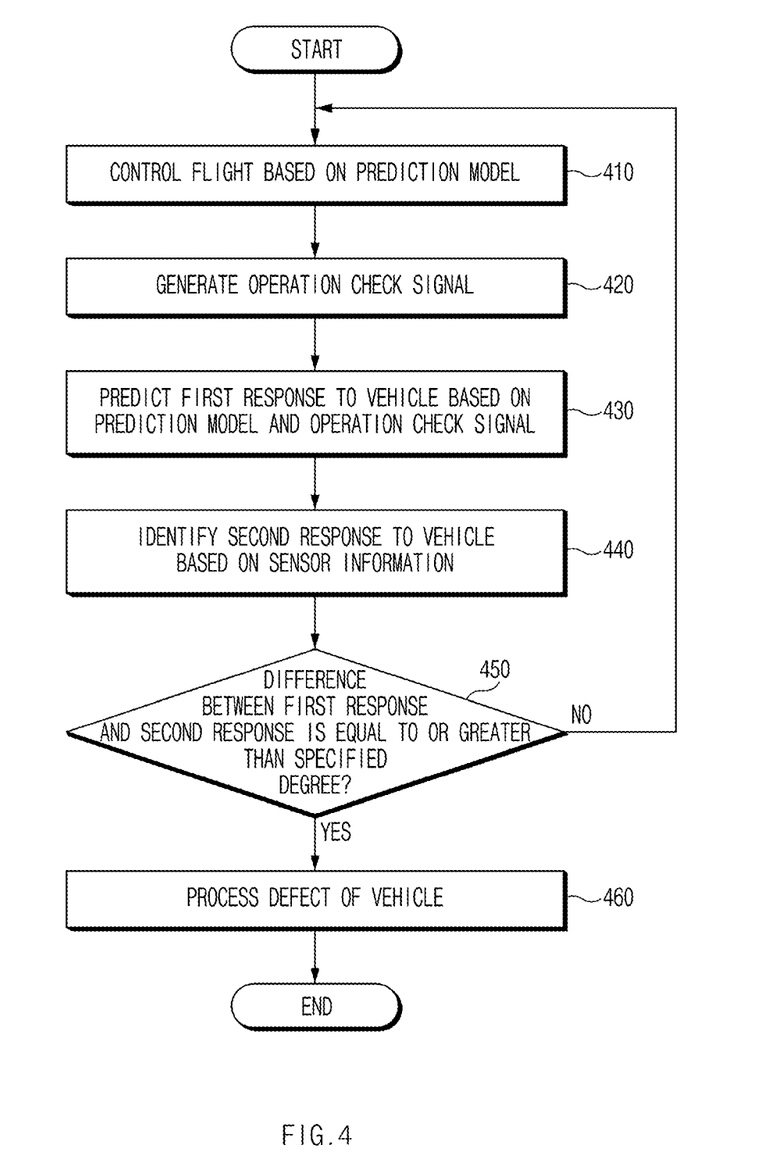
FIG. 4 is a flowchart illustrating an operation of detecting a defect in an aerial vehicle.

FIG. 4 is a flowchart illustrating an operation of detecting a defect in an aerial vehicle. In the following description, the operations may be sequentially performed, but are not necessarily performed sequentially. For example, the order of operations may be changed, and at least two operations may be performed in parallel. In addition, at least one of the following operations may be omitted.

Referring to FIG. 4, an aerial vehicle (or the flight control apparatus 100 or the processor 109) may control the flight of the aerial vehicle based on a prediction model in operation 410. In some implementations, the aerial vehicle may control the flight based on a first prediction model or a second prediction model.

According to various implementations, in operation 420, the aerial vehicle (or the flight control apparatus 100 or the processor 109) may generate an operation check signal. The operation check signal may be a signal for forcibly changing the operating state of a specific component among components provided in the aerial vehicle. For example, the operation check signal may be a signal for inactivating the operation of one of the sensors 101 provided in the aerial vehicle or changing (e.g., reducing) the sensing range.

According to various implementations, the aerial vehicle (or the flight control apparatus 100 or the processor 109) may predict a first response to the aerial vehicle based on the prediction model and the operation check signal in operation 430. The first response may be a response of the aerial vehicle predicted by the prediction model learned through machine learning.

According to various implementations, in operation 440, the aerial vehicle (or the flight control apparatus 100 or the processor 109) may identify the second response of the vehicle based on the sensor information. The second response may be an actual response of the aerial vehicle determined based on the sensor information collected during flight.

According to various implementations, in operation 450, the aerial vehicle (or the flight control apparatus 100 or the processor 109) may determine whether the difference between the first response and the second response is equal to or greater than a specified degree. In other words, the aerial vehicle may determine whether there is a difference between the response of the aerial vehicle predicted through the prediction model and the actual response of the aerial vehicle.

According to various implementations, when the first response and the second response are substantially the same, the aerial vehicle (or the flight control apparatus 100 or the processor 109) may control the flight based on the prediction model. For example, the aerial vehicle may perform operations related to operations 410 to 450.

According to various implementations, when the difference between the first response and the second response is greater than or equal to a specified degree, in operation 460, the aerial vehicle (or the flight control apparatus 100 or the processor 109) may process a defect in the aerial vehicle. In some implementations, the aerial vehicle may generate and output a warning indicating a defect as a part of defect processing. Such warning may be transmitted to the control system. Additionally or selectively, the warning may be output through the aerial vehicle (e.g., a visual alarm output using the light emission of a light emitting device, an audible alarm output using a speaker, or the like).

According to another embodiment, the aerial vehicle may generate a virtual sensor for the sensor 101 in which a defect occurs as part of defect processing, and may use the information generated by the virtual sensor to estimate (or control flight) the flight state of the aerial vehicle instead of the information collected by the sensor in which the defect occurs. According to still another embodiment, the aerial vehicle may determine that the normal flight of the aerial vehicle is difficult due to a defect as a part of defect processing and generate a control command (or control signal) for inducing an emergency landing to a preset location (or area).

Figure 5:
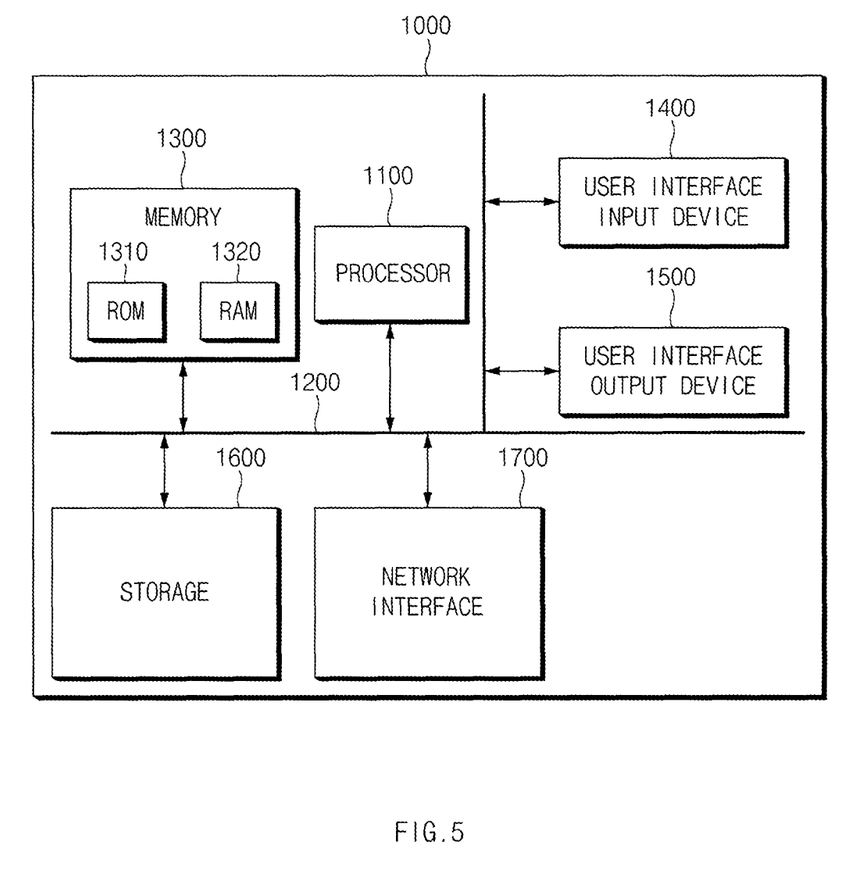
FIG. 5 is a block diagram illustrating the configuration of a computing system.

FIG. 5 is a block diagram illustrating the configuration of a computing system.

Referring to FIG. 5, the flight control apparatus 100 may be applied to a computing system. In some implementations, a computing system 500 may include at least one processor 520, a memory 530, a user interface input device 540, a user interface output device 550, storage 560, and a network interface 570 connected through a bus 510.

The processor 520 may be a central processing device (CPU) or a semiconductor device that processes instructions stored in the memory 530 and/or the storage 560. The memory 530 and the storage 560 may include various types of volatile or non-volatile storage media. For example, the memory 530 may include a ROM (Read Only Memory) 531 and a RAM (Random Access Memory) 533.

Accordingly, the processes of the method or algorithm described in relation to the implementations of the present disclosure may be implemented directly by hardware executed by the processor 520, a software module, or a combination thereof. The software module may reside in a storage medium (that is, the memory 530 and/or the storage 560), such as a RAM, a flash memory, a ROM, an EPROM, an EEPROM, a register, a hard disk, a detachable disk, or a CD-ROM.

The exemplary storage medium is coupled to the processor 520, and the processor 520 may read information from the storage medium and may write information in the storage medium. In another method, the storage medium may be integrated with the processor 520. The processor 520 and the storage medium may reside in an application specific integrated circuit (ASIC). The ASIC may reside in a user terminal. In another method, the processor and the storage medium may reside in the user terminal as an individual component.

The present technology may collect the flight parameters for the aerial vehicle based on the flight state predicted through the flight state prediction model and the actual flight state confirmed through the sensor while the aerial vehicle is flying, and apply the flight parameters to flight control, thereby improving the flight control performance of the aerial vehicle.

In addition, the present technology may update the flight state prediction model based on the flight state predicted through the flight state prediction model and the actual flight state confirmed through the sensor while the aerial vehicle is flying, thereby improving the flight control performance of the aerial vehicle.

In addition, the present technology may detect a defect in the aerial vehicle based on the flight state predicted through the flight state prediction model and the actual flight state confirmed through the sensor while the aerial vehicle is flying, and control the flight based on the detection result, thereby immediately coping with the abnormal flight of the aerial vehicle.

In addition, various effects that are directly or indirectly understood through the present disclosure may be provided.

Although exemplary implementations of the present disclosure have been described for illustrative purposes, those skilled in the art will appreciate that various modifications, additions and substitutions are possible, without departing from the scope and spirit of the disclosure.

Therefore, the exemplary implementations disclosed in the present disclosure are provided for the sake of descriptions, not limiting the technical concepts of the present disclosure, and it should be understood that such exemplary implementations are not intended to limit the scope of the technical concepts of the present disclosure. The protection scope of the present disclosure should be understood by the claims below, and all the technical concepts within the equivalent scopes should be interpreted to be within the scope of the right of the present disclosure.

What is claimed is:

1. A flight control apparatus comprising:
a communication circuit configured to receive, from a control system, first information related to operation information for a movement of an aerial vehicle;
a sensor configured to obtain second information related to flight data of the aerial vehicle;
a memory configured to store (i) a prediction model for predicting a flight state of the aerial vehicle based on the first information and the second information and (ii) a flight parameter estimation value including at least one of a landing gear spring coefficient, an aerodynamic coefficient, a friction coefficient, a control surface effect, a thrust coefficient, or inertia moment; and
a processor electrically connected to the communication circuit, the sensor, and the memory,
wherein the processor is configured to:
(S1) generate a first control signal configured to control the movement of the aerial vehicle by applying machine-learning to a state variable of the aerial vehicle, the state variable corresponding to the operation information and the flight parameter estimation value,
(S2) compare (i) an estimated measurement value of a state variable of the aerial vehicle predicted through the prediction model with (ii) a state variable measurement value of the aerial vehicle measured, while the movement of the aerial vehicle is controlled according to the first control signal, based on the second information,
(S3) based on a difference between the estimated measurement value of the state variable and the state variable measurement value being within a specified range, generate a second control signal according to the flight parameter estimation value stored in the memory, and
(S4) based on the difference between the estimated measurement value of the state variable and the state variable measurement value being outside of the specified range, update the flight parameter estimation value stored in the memory and generate the second control signal according to the updated flight parameter estimation value,
wherein the processor is configured to:
compare (i) the predicted flight state of the aerial vehicle predicted through the prediction model with (ii) an actual flight state of the aerial vehicle determined based on the second information,
update the prediction model stored in the memory based on a comparison result, and
control the movement of the aerial vehicle based on the predicted flight state of the aerial vehicle predicted through the updated prediction model, and
wherein the flight state of the aerial vehicle comprises at least one of a flight altitude, a flight path angle, a flight speed, or a flight posture.

2. The flight control apparatus of claim 1, wherein the processor is configured to:
generate a specified control signal configured to control the movement of the aerial vehicle, and
update the prediction model by using a flight parameter as learning data while the movement is controlled based on the generated specified control signal.

3. The flight control apparatus of claim 1, wherein the processor is configured to monitor a defect of the aerial vehicle based on (i) a flight state predicted through the prediction model and (ii) a flight state obtained based on the second information while the movement of the aerial vehicle is controlled.

4. The flight control apparatus of claim 3, wherein the sensor includes a first sensor configured to obtain information related to first flight data and a second sensor configured to obtain information related to second flight data, and
wherein the processor is configured to:
deactivate an operation of the first sensor,
compare (i) a predicted response of the aerial vehicle predicted through the prediction model while the operation of the first sensor is deactivated with (ii) an actual response of the aerial vehicle determined based on the information obtained through the second sensor, and
determine, based on a difference between the predicted response and the actual response being greater than or equal to a specified level, that the first sensor is defective.

5. The flight control apparatus of claim 4, wherein the processor is configured to, based on a determination that the first sensor is defective, notify the control system regarding the defect.

6. The flight control apparatus of claim 4, further comprising:
an output device including at least one of a light emitting device or a speaker,
wherein the processor is configured to, based on a determination that the first sensor is defective, notify the defect through the output device.

7. The flight control apparatus of claim 4, wherein the processor is configured to, based on a determination that the first sensor is defective, generate a control command for inducing an emergency landing to a specified location.

8. The flight control apparatus of claim 4, wherein the processor is configured to, based on a determination that the first sensor is defective, use information generated by a virtual sensor instead of the first sensor to estimate the flight state of the aerial vehicle.

9. The flight control apparatus of claim 4, wherein the processor is configured to determine whether the second sensor is defective after determining whether the first sensor is defective.

10. A method of operating a flight control apparatus, the method comprising:
receiving, from a control system, first information related to operation information for a movement of an aerial vehicle;
generating a first control signal configured to control the movement of the aerial vehicle by applying machine-learning to a state variable of the aerial vehicle, the state variable corresponding to the operation information and a flight parameter estimation value including at least one of a landing gear spring coefficient, an aerodynamic coefficient, a friction coefficient, an control surface effect, a thrust coefficient, or inertia moment stored in the aerial vehicle;
obtaining second information related to flight data through a sensor provided in the aerial vehicle while the movement of the aerial vehicle is controlled based on the first control signal;
predicting an estimated measurement value of a state variable for the aerial vehicle by using a prediction model using the first information and the second information as input data;
comparing the estimated measurement value of the state variable of the aerial vehicle with a state variable measurement value of the aerial vehicle measured based on the second information;

generating, based on a difference between the estimated measurement value of the state variable and the state variable measurement value being within a specified range, a second control signal according to the flight parameter estimation value stored in the aerial vehicle;

based on the difference between the estimated measurement value of the state variable and the state variable measurement value being outside of the specified range, updating the flight parameter estimation value stored in the aerial vehicle and generating the second control signal according to the updated flight parameter estimation value;

comparing (i) a predicted flight state of the aerial vehicle predicted through the prediction model with (ii) an actual flight state of the aerial vehicle determined based on the second information;

updating the prediction model stored in the aerial vehicle based on a comparison result; and controlling the movement of the aerial vehicle based on the predicted flight state of the aerial vehicle predicted through the updated prediction model, and wherein the flight state of the aerial vehicle comprises at least one of a flight altitude, a flight path angle, a flight speed, or a flight posture.

11. The method of claim 10, wherein updating of the prediction model includes:

generating a specified control signal configured to control the flight of the aerial vehicle, and updating the prediction model by using a flight parameter as learning data while the movement is controlled based on the generated specified control signal.

12. The method of claim 10, further comprising:

monitoring a defect of the aerial vehicle based on (i) a flight state predicted through the prediction model and (ii) a flight state obtained based on the second information while the movement of the aerial vehicle is controlled.

13. The method of claim 12, wherein the sensor includes a first sensor configured to obtain information related to first flight data and a second sensor configured to obtain information related to second flight data, and wherein monitoring of the defect of the aerial vehicle includes:

deactivating an operation of the first sensor, comparing (i) a predicted response of the aerial vehicle predicted through the prediction model while the operation of the first sensor is deactivated with (ii) an actual response of the aerial vehicle determined based on the information obtained through the second sensor, and determining, based on a difference between the predicted response and the actual response being greater than or equal to a specified level, that the first sensor is defective.

14. The method of claim 13, further comprising:

notifying, based on a determination that the first sensor is defective, the control system regarding the defect.

15. The method of claim 13, further comprising:

notifying, based on a determination that the first sensor is defective, the defect through at least one of a light emitting device or a speaker of the aerial vehicle.

16. The method of claim 13, further comprising:

generating, based on a determination that the first sensor is defective, a control command for inducing an emergency landing to a specified location.

17. The method of claim 13, further comprising:

using information generated by a virtual sensor instead of the first sensor to estimate the flight state of the aerial vehicle based on a determination that the first sensor is defective.

18. The method of claim 13, further comprising:

determining whether the second sensor is defective after determining whether the first sensor is defective.

* * * * *